(12) United States Patent
Brannon et al.

(10) Patent No.: US 7,772,163 B1
(45) Date of Patent: *Aug. 10, 2010

(54) WELL TREATING COMPOSITE CONTAINING ORGANIC LIGHTWEIGHT MATERIAL AND WEIGHT MODIFYING AGENT

(75) Inventors: Harold Dean Brannon, Magnolia, TX (US); Allan Ray Rickards, Tomball, TX (US); Christopher John Stephenson, Houston, TX (US)

(73) Assignee: BJ Services Company LLC, Houston, TX (US)

( * ) Notice: Subject to any disclaimer, the term of this patent is extended or adjusted under 35 U.S.C. 154(b) by 196 days.

This patent is subject to a terminal disclaimer.

(21) Appl. No.: 11/971,811

(22) Filed: Jan. 9, 2008

Related U.S. Application Data (63) Continuation-in-part of application No. 11/787,269, filed on Apr. 13, 2007, now abandoned, which is a continuation of application No. 10/863,731, filed on Jun. 9, 2004, now Pat. No. 7,207,386.

(60) Provisional application No. 60/480,063, filed on Jun. 20, 2003.

(51) Int. Cl.
*C09K 8/60* (2006.01)
*C04B 14/00* (2006.01)
*C08J 7/04* (2006.01)

(52) U.S. Cl. .................. 507/219; 106/405; 106/409; 507/220; 507/224; 507/231; 516/98; 516/99; 523/527

(58) Field of Classification Search ........... 507/219, 507/220, 224, 231; 106/405, 409; 516/98, 516/99; 523/527
See application file for complete search history.

(56) References Cited

U.S. PATENT DOCUMENTS

| | | | |
|---|---|---|---|
| 2,869,642 A | 1/1959 | McKay et al | |
| 3,121,464 A | 2/1964 | Huitt et at | |
| 3,127,937 A | 4/1964 | McGuire, Jr et at | |
| 3,151,678 A | 10/1964 | Hanson | |
| 3,159,217 A | 12/1964 | Hanson | |
| 3,245,468 A | 4/1966 | Huitt | |
| 3,335,797 A | 8/1967 | Braunlich, Jr | |
| 3,372,752 A | 3/1968 | Prater | |
| 3,399,727 A | 9/1968 | Graham et at | |
| 3,417,819 A | 12/1968 | Wyllie | |
| 3,497,008 A | 2/1970 | Graham et at | |
| 3,709,300 A | 1/1973 | Pye et al. | |
| 3,954,142 A | 5/1976 | Broaddus et al. | |
| 4,078,609 A | 3/1978 | Pavlich | |
| 4,109,721 A | 8/1978 | Slusser | |
| 4,442,897 A | 4/1984 | Crowell | |
| 4,509,598 A | 4/1985 | Earl et al. | |
| 4,850,430 A | 7/1989 | Copeland et al. | |
| 4,887,670 A | 12/1989 | Lord et al. | |
| 4,923,714 A | 5/1990 | Gibb et al. | |
| 4,969,523 A | 11/1990 | Martin et al. | |
| 5,069,283 A | 12/1991 | Mack | |
| 5,074,359 A | 12/1991 | Schmidt | |
| 5,218,038 A | 6/1993 | Johnson et al. | |
| 5,378,533 A * | 1/1995 | Ota .................. | 428/304.4 |
| 5,465,792 A | 11/1995 | Dawson et al. | |
| 5,531,274 A | 7/1996 | Bienvenu, Jr. et al. | |
| 5,558,160 A | 9/1996 | Tudor | |
| 5,639,806 A | 6/1997 | Johnson et al. | |
| 5,735,349 A | 4/1998 | Dawson et al. | |
| 5,753,362 A * | 5/1998 | Kawase et al. ........... | 428/327 |
| 5,916,933 A | 6/1999 | Johnson et al. | |
| 6,059,034 A | 5/2000 | Rickards et al. | |
| 6,169,058 B1 | 1/2001 | Le et al. | |
| 6,228,812 B1 | 5/2001 | Dawson et al. | |
| 6,330,916 B1 | 12/2001 | Rickards et al. | |
| 6,364,018 B1 | 4/2002 | Brannon et al. | |
| 6,406,789 B1 | 6/2002 | McDaniel et al. | |
| 6,491,099 B1 | 12/2002 | Di Lullo Arias et al. | |
| 6,508,305 B1 | 1/2003 | Brannon et al. | |
| 6,528,157 B1 | 3/2003 | Hussain et al. | |
| 6,582,819 B2 | 6/2003 | McDaniel et al. | |
| 6,632,527 B1 | 10/2003 | McDaniel et al. | |
| 6,749,025 B1 | 6/2004 | Brannon et al. | |
| 6,772,838 B2 | 8/2004 | Dawson et al. | |
| 6,776,235 B1 | 8/2004 | England | |
| 6,860,328 B2 | 3/2005 | Gonzalez et al. | |
| 7,153,575 B2 | 12/2006 | Anderson et al. | |

(Continued)

FOREIGN PATENT DOCUMENTS

EP 0 773 343 A2 1/2002

(Continued)

*Primary Examiner*—Timothy J. Kugel
(74) *Attorney, Agent, or Firm*—Jones & Smith, LLP; John Wilson Jones (57) ABSTRACT

Well treating composites are composed of an organic lightweight material and a weight modifying agent. The organic lightweight material preferably forms the continuous phase and the weight modifying agent forms the discontinuous phase. The apparent specific gravity (ASG) of the organic lightweight material is less than the ASG of the well treating composite. The composite of the invention is particularly useful in hydraulic fracturing fluids as lightweight proppants as well as in sand control methods, such as gravel packing and frac packing A subterranean formation may be treated by injecting the well treating composite into the formation in order to increase fracture conductivity, reduce the generation of fines, reduced unwanted water production and/or reduce particulate production.

25 Claims, 4 Drawing Sheets

U.S. PATENT DOCUMENTS

| | | |
|---|---|---|
| 7,207,386 B2 | 4/2007 | Brannon et al. |
| 7,270,879 B2 | 9/2007 | McCrary |
| 7,528,096 B2 * | 5/2009 | Brannon et al. ............ 507/269 |
| 7,624,802 B2 | 12/2009 | McCrary et al. |
| 2002/0048676 A1 | 4/2002 | McDaniel et al. |
| 2003/0102128 A1 | 6/2003 | Dawson et al. |
| 2004/0040708 A1 | 3/2004 | Stephenson et al. |

FOREIGN PATENT DOCUMENTS

| | | |
|---|---|---|
| WO | WO 2004/083600 A1 | 9/2004 |

* cited by examiner

WELL TREATING COMPOSITE CONTAINING ORGANIC LIGHTWEIGHT MATERIAL AND WEIGHT MODIFYING AGENT

This application is a continuation-in-part application of U.S. patent application Ser. No. 11/787,269, filed on Apr. 13, 2007, which is a continuation of U.S. patent application Ser. No. 10/863,731, filed Jun. 9, 2004 (now U.S. Pat. No. 7,207,386, issued on Apr. 24, 2007), which claims the benefit of U.S. patent application Ser. No. 60/480,063, filed Jun. 20, 2003.

FIELD OF THE INVENTION

The invention relates to an ultra lightweight (ULW) well treating composite containing an organic lightweight material and a weight modifying agent wherein the apparent specific gravity (ASG) of the organic lightweight material is either greater or less than the ASG of the well treating composite. The invention further relates to a method of treating subterranean formations and, more specifically, to hydraulic fracturing treatments for subterranean formations, by using the defined well treating composite.

BACKGROUND OF THE INVENTION

In the production of fluids from subterranean formations, it has been a long-standing practice to stimulate the formation from a wellbore to enhance the flow of fluids from the formation into the wellbore. A common stimulation technique is hydraulic fracturing. During hydraulic fracturing, a fracturing fluid containing a solid proppant is injected into the wellbore at high pressures to create or enlarge fractures in the rock formation surrounding the wellbore. The fractures radiate outwardly from the wellbore, typically from a few to hundreds of meters, and extend the surface area from which oil or gas drains into the well. The proppant is deposited in the fracture, where it remains after the treatment is completed. After deposition, the proppant serves to hold the fracture open, thereby enhancing the ability of fluids or natural gas to migrate from the formation to the wellbore through the fracture. Stimulation procedures often require the use of well treating materials having high compressive strength.

One problem related to hydraulic fracturing treatments is the creation of reservoir fines which leads to reduction in fracture conductivity. Such fines may be produced when the proppant is subjected to reservoir closure stresses within a formation fracture. This, in turn, causes the proppant to be compressed in such a way that small particles, or fines, are generated from the proppant and/or reservoir matrix. Production of fines is undesirable for a number of reasons, such as reduction in reservoir permeability due to plugging of pore throats in the reservoir matrix.

Another problem related to hydraulic fracturing treatments is undesirable fracture height growth. In the absence of suitable boundaries, it is not uncommon during hydraulic fracturing for the fracture to grow out of the zone of productive interest and proceed into a zone of non-productive interest, including zones containing water. Most often, such problem areas are associated with non-productive fracture growth below the zone of productive interest. Many different approaches have been used to minimize or avoid the occurrence of such phenomena including the development of modified perforating schemes and reduction in treatment rates. Another approach has been to use a fracturing fluid which carries a heavy proppant, such as sand. Such methods do not however provide a satisfactory solution to the production of unwanted water.

The problem of undesirable fracture height growth may particularly be a problem when practicing slickwater treatments, in light of the poor transport properties of slickwater fluids which allow proppants to settle, forming a "proppant bank" at the bottom of the created fracture. Unfortunately, such proppant banks in contact with water producing zones often provide a high permeability conduit for unwanted water production.

In the past, many different materials have been used as proppants including sand, glass beads, walnut hulls, and metal shot as well as resin-coated sands, intermediate strength ceramics, and sintered bauxite; each employed for their ability to cost effectively withstand the respective reservoir closure stress environment. The relative strength of these various materials increases with their corresponding apparent specific gravity (ASG), typically ranging from 2.65 for sands to 3.4 for sintered bauxite. Unfortunately, increasing ASG leads directly to increasing degree of difficulty with proppant transport and reduced propped fracture volume, thereby reducing fracture conductivity.

More recently, ultra lightweight (ULW) materials have been used as proppants since they reduce the fluid velocity required to maintain proppant transport within the fracture, which, in turn, provides for a greater amount of the created fracture area to be propped. Exemplary of such proppants are significantly lighter deformable particles. Such ULW proppants, like conventional heavier proppants, have the capability to effectively withstand reservoir closure stress environments while increasing fracture conductivity.

Successful deformable particles include modified ground walnut hulls which are capable of withstanding higher closure stress than walnut hulls in their natural state. Modified walnut hull based ULW proppants are manufactured by impregnating closely sized walnut particles (i.e. 20/30 US mesh) with epoxy or other resins. These impregnated walnut hull particles are then coated with phenolic or other resins. Such walnut hull based ULW proppants have a bulk density of 0.85 grams/cc. Further exemplary of deformable particles are polystyrene divinylbenzene (PSDVB) deformable beads.

While deformable particles offer excellent deformability and compressive strength, they readily soften and loose their compressive strength, and thus their structural integrity and elasticity, at increasing downhole temperatures and confining stress. Previous efforts undertaken to employ lower density materials as proppant have generally resulted in failure due to insufficient strength to maintain fracture conductivity at even the lowest of closure stresses (1,000 psi).

A need therefore exists for well treating materials which are lightweight, exhibit high fracture conductivity, reduce fines creation, exhibit greater heat resistance at increased downhole temperatures and exhibit excellent deformability and compressive strength. Such materials need to be of low density and be capable of facilitating improved placement of proppant within the fracture while minimizing settling. A need further exists for well treatment materials which are effective in the mitigation of undesirable fracture height growth.

SUMMARY OF THE INVENTION

The invention relates to a well treating composite composed of an organic lightweight material and a weight modifying agent. The apparent specific gravity (ASG) of the organic lightweight material is either greater than or less than the ASG of the well treating composite depending on if the weight modifying agent is a weighting agent or weight reducing agent, respectively. Typically, the ASG of the well treating composite is between from about 0.7 to about 1.5.

Where the weight modifying agent is a weighting agent, the ASG of the well treating composite is typically at least one and a half times the ASG of the organic lightweight material, the ASG of the well treating composite is preferably between from 1.0 to 1.5. In a preferred embodiment, the ASG of the organic lightweight material in such systems is approximately 0.7 to about 1.0 and the ASG of the well treating composite is between from about 1.05 to about 1.5.

Where the weight modifying agent is a weight reducing agent, the ASG of the weight reducing agent is less than 1.0 and the ASG of the organic lightweight material is less than or equal to 1.1.

In a preferred mode, the organic lightweight material forms the continuous (external) phase for the well treating composite, whereas the weight modifying agent forms the discontinuous (internal) phase.

The weight modifying agent may be sand, glass, hematite, silica, sand, fly ash, aluminosilicate, and an alkali metal salt or trimanganese tetraoxide. Further, the weight modifying agent may be a cation selected from alkali metal, alkaline earth metal, ammonium, manganese, and zinc and an anion selected from a halide, oxide, a carbonate, nitrate, sulfate, acetate and formate. Glass bubbles, fly ash and carbon black are often preferred, especially when the weight modifying agent is a weight reducing agent. The organic lightweight material is preferably a thermosetting resin.

The composite of the invention is particularly useful in hydraulic fracturing fluids as lightweight proppants. In one application, the conductivity of water inflow below the productive zone of the subterranean formation is reduced by use of the well treating composite.

Further, the composite is especially useful in sand control methods such as gravel packing and frac packing. In a preferred embodiment, a subterranean formation may be treated by injecting the well treating composite into the formation in order to increase fracture conductivity, reduce the generation of fines, and/or reduce particulate production.

In another embodiment, unwanted water production may be reduced during treatment of the formation by a two-step process. In the first step, a proppant-free fluid is introduced into the subterranean formation for a time and at an injection rate sufficient to initiate a fracture in and below the productive zone of the formation. In a preferred mode, the proppant-free fluid may comprise salt water, fresh water, brine, liquid hydrocarbon, and/or nitrogen or other gases. The proppant-free fluid may further be weighted. In the second step, a proppant laden slurry is introduced into the subterranean formation. The proppant laden slurry preferably contains the well treating composite as proppant. Typically, either the fluid density of the proppant-free fluid is greater than the fluid density of the proppant laden slurry; or the viscosity of the proppant-free fluid is greater than the viscosity of the proppant laden slurry.

Where the fluid density of the proppant-free fluid is greater than the fluid density of the proppant laden slurry, the method of the invention further limits undesirable fracture height growth in the hydrocarbon-bearing subterranean formation during the fracturing. The fracture, initiated by the introduction of the proppant-free fluid, grows below the productive zone of the formation, the proppant-free slurry migrating to the lower extremities of the initiated fracture by gravity segregation. The density differential of the proppant-free fluid and the proppant laden slurry allows the proppant laden slurry to override the dense proppant-free fluid, thereby causing a separation of the proppant laden slurry from the proppant-free fluid.

BRIEF DESCRIPTION OF THE DRAWINGS

In order to more fully understand the drawings referred to in the Detailed Description of the Preferred Embodiments, a brief description of the drawings is presented, in which.

DETAILED DESCRIPTION OF THE PREFERRED EMBODIMENTS

The composition defined herein is a composite which is useful in the treatment of wells. A multitude of composite components may be bonded or held together as an aggregate pack.

When used in hydraulic fracturing, the composition of the invention facilitates placement of proppant within the fracture while minimizing settling, thereby enhancing fracture conductivity. Minimal, if any, fines generation occurs upon the application of closure stresses on the well treating composite or aggregate pack. Further, since they are deformable, the well treating composite or pack is resistant to crush during the fracturing process. By "deformable", it is meant that the well treating composite or aggregated pack of composites deform upon application of minimum stress rather than shattering or breaking, as evidenced with conventional rigid proppants. After repeated production/shut-in cycles, the composite or aggregated pack continues to exhibit deformability as the fracture is subjected to stress cycling. After exposure of maximum applicable closure stresses, little, if any, of the deformable composite or aggregated pack is embedded in the formation rock subjected to fracturing. The in situ deformation of the composite or pack serves as a cushion to absorb stress, thus minimizing embedment into the fracture face. As a result, less fines are generated and permeability and/or conductivity are maintained. Productivity of the well is therefore enhanced.

In addition, the composite is effective in reducing particulate production as well as unwanted water production. In addition, the composite may further be used as part of a sand control well treatment fluid, e.g., a gravel pack fluid, frac pack fluid, etc.

In a preferred embodiment of the invention, a fluid is injected into the subterranean formation which is void of a proppant. The injection of this fluid, often referred to as a "pre-pad," serves to open the main body of the fracture and develops a relatively large radius of curvature near the wellbore. The pre-pad has physical properties which lead the subsequently pumped proppant laden slurry of lower density and/or viscosity to override and stay substantially separated from it. Thus, the proppant avoids migration into the lower non-productive zone of the formation.

The injection rate is typically between from about 5 to about 150 barrels per minute. Typically, the volume of pre-pad is determined by the constraints of the fracture design and may range from 20 to many hundreds of barrels.

The proppant-free fluid is typically injected into the subterranean formation at ambient surface temperature and at pressures typically less than 10,000 psi. It also being understood that core and/or layer materials may be selected by those of skill in the art to meet and withstand anticipated downhole conditions of a given application.

The proppant-free fluid typically may be salt water, fresh water, brine, liquid hydrocarbon and/or nitrogen or other gases or any other pre-pad pumping solution known to those of skill in the art. For instance, the proppant-free fluid may be a linear or crosslinked fluid such as a polymeric dispersion of hydrophilic water swellable particles crosslinked so that they are water insoluble, but capable of swelling in the presence of relatively small amounts of water. Such polymeric particulates swell and reduce fluid loss to the formation during the treatment.

In a preferred embodiment, the proppant-free fluid contains a water control additive and/or a relative permeability modifier. Suitable as fluid loss additives include corn starch (especially 100 mesh corn starch) as well as surfactants comprising an alkyl sarcosinate having from about 12 to 24 carbon atoms in the alkyl group; the latter disclosed in U.S. Pat. No. 6,491,099, herein incorporated by reference. Particularly preferred as water control additive is AquaCon, a product of BJ Services Company. See U.S. Pat. No. 6,228,812. Incorporation of such water control additives serves to impede the flow of water through the created but unpropped fracture below the productive zone. When present, the total volume of fluid loss additive(s) in the proppant-free fluid is between from about 0.1 to about 5, preferably about 2, volume percent.

The relative permeability modifier (RPM) for use in the invention is any substance known in the art that can impede the production of water. Suitable as the RPM are homopolymers and copolymers of acrylamide, optionally having been sulfonated or quaternized, polyvinylalcohol, polysiloxane, or a hydrophilic polymer selected from natural gums and chemically modified derivatives thereof. Such RPMs include those disclosed in U.S. Pat. Nos. 6,228,812, 5,735,349; 6,169,058, and U.S. patent application Ser. No. 10/386,160, filed on Mar. 10, 2003, all of which are herein incorporated by reference.

Most often the RPM is hydrophilic having the ability to remain hydrated in the formation waters and simultaneously having an affinity to adsorb onto the solid formation material. Such RPMs typically have weight average molecular weights ranging from about 20,000 to about 20,000,000 g/mole, preferably from about 100,000 to about 5,000,000 g/mole, most preferably from about 250,000 to about 2,000,000 g/mole.

Further, the term RPM as used herein shall further refer to those RPM systems as disclosed in U.S. patent application Ser. No. 10/386,160, filed on Mar. 10, 2003, herein incorporated by reference. In addition to the molecular weight, the RPMs must also have specific sites that allow interaction with the organosilicon compound. Such RPM systems comprise a RPM (as defined above) and an organosilicon compound In a preferred mode, the organosilicon compound is of the formula:

(I)

wherein R is a halogen, hydrogen, or an amine radical which can be substituted with hydrogen, organic radicals, or silyl groups, $R_1$ is hydrogen, an amine, or an organic radical having from 1 to 50 carbon atoms, and $R_2$ and $R_3$ are hydrogen or the same or different halogens, alkyl, alkenyl, aryl or amines having 1 to 50 carbon atoms; or (II)

wherein $R_4$, $R_5$ and $R_6$ are independently selected from hydrogen, amine, halogen, alkoxide, and organic radicals having from 1 to 50 carbon atoms, provided not all of $R_4$, $R_5$ and $R_6$ are hydrogen, and $R_7$ is an organic radical having from 1 to 50 carbon atoms, preferably $R_7$ is selected from amine, alkyl, alkenyl, and aryl groups having from 1 to 18 carbon atoms.

In addition to the hydrophillic swelling polymers, the proppant-free fluid may contain a hydrophilic polymer further include natural gums such as guar, carrageenan, gum Arabic, gum ghatti, karaya, tragacanth, pectin, starch, locust bean gum, scleroglucan, tamarind and xanthan gums and any chemically modified derivatives of these gums including derivatives of cellulose such as the pendent derivatives hydroxyethyl, hydroxypropyl, hydroxypropylcarboxymethyl, hydroxyethylcarboxymethyl, carboxymethyl or methyl or a derivative thereof.

Further, the proppant-free fluid may contain a weighting material in order to impart higher density to the fluid. Suitable weighting materials are those which have one or more water soluble calcium salts (typically calcium halide salts such as $CaCl_2$, etc.) dissolved therein. Where the proppant-free fluid is a brine, the density of the weighted brine will generally be in the range of from about 10 to about 18 lb/gal, preferably from about 15 to about 18 lb/gal. The high density proppant-free fluids can suitably also contain other weighting materials known in the art such as other water soluble salts like sodium salts, such as sodium chloride, sodium bromide, etc.; zinc salts, such as zinc chloride, zinc bromide, etc.; and sodium, potassium and cesium salts of formates and the like. However, in those instances wherein zinc salts such as zinc chloride or bromide are to be included, it is generally advisable and preferable to limit the amount thereof to a maximum level of about 2 weight percent or less (based upon the total weight of the brine composition) in order to minimize the risks of zinc sulfide precipitation which may otherwise occur within the formation in connection therewith. Other suitable weighting materials include ground glass, glass powder, as well as fiberglass.

The pre-pad pumping treatment is followed by an injection of a proppant-laden slurry. The propping agents may be those well treating composite or aggregated pack defined herein and normally are used in concentrations between about 1 to 18 pounds per gallon of fracturing fluid composition, but higher or lower concentrations can be used as required. Typically, from about 2,000 to about 4,000 barrels of proppant laden slurry containing a total of about 100,000 to about 350,000 pounds of proppant is pumped into the formation. The proppant-laden slurry may be pumped into the formation in successive stages, if desired.

Typically, the proppant-laden slurry is injected into the formation at ambient surface temperature and at pressures usually less than 10,000 psi. However, these stated conditions are exemplary only.

The proppant-laden slurry is pumped at a rate sufficient to place the proppant into the fracture and form a proppant bank. During the actual pumping the pH may be adjusted by the addition of a buffer, followed by the addition of the enzyme breaker, crosslinking agent, and other additives if required. After deposition, the proppant material serves to hold the fracture open. For reasons apparent below, the proppant-laden slurry typically does not contain a weighting agent.

In the practice of the invention, proppant-laden slurry may be any carrier fluid suitable for transporting a mixture of proppant into a formation fracture in a subterranean well. Such fluids include, but are not limited to, carrier fluids comprising salt water, fresh water, liquid hydrocarbons, and/or nitrogen or other gases. Typically, viscous gels or foams are employed as the fracturing fluid in order to provide a medium that will adequately suspend and transport the solid proppant, as well as to impair loss of fracture fluid to the formation during treatment (commonly referred to as "filterability" or "fluid loss"). As such, viscosity of the fracturing fluid may affect fracture geometry because fluid loss affects the efficiency of a treatment. For example, when the rate of fluid loss to the formation equals or exceeds the rate of injection or introduction of fluid into a fracture, the fracture stops growing. Conversely, when the rate of fluid loss is less than the injection or introduction rate, taken together with other factors, a fracture continues to propagate. Excessive fluid loss thus results in fractures that are smaller and shorter than desired.

In light of the differences in the fluid properties between the proppant-free fluid and the proppant-laden slurry, the proppant-laden slurry overrides the heavier proppant-free fluid, which has migrated down into the fracture growth created below the productive zone. As such, the conductivity of water inflow below the productive zone of the formation is reduced. Once pumping is completed and the fracture closes, the areas below the productive zone remain un-propped and thus have a much lower conductivity to inflow of bottom water.

The method of the invention has particular applicability in limiting undesirable fracture height growth in the hydrocarbon-bearing subterranean formation. Since the fracture, initiated by the introduction of the proppant-free fluid, grows below the productive zone of the formation, the proppant-free slurry migrates to the lower extremities of the initiated fracture. Such growth proceeds by gravity segregation. The density differential of the proppant-free fluid and the proppant laden slurry allows the proppant laden slurry to override the dense proppant-free fluid, thereby causing a separation of the proppant laden slurry from the proppant-free fluid. After the fracture is closed, the area below the fracture of the productive zone is unpropped. As a result, the conductivity of inflow of water below the productive zone of a subterranean formation is reduced.

The methods defined herein employ a relatively lightweight or substantially neutrally buoyant particulate material or a mixture thereof. Such proppants may be chipped, ground, crushed, or otherwise processed to produce particulate material having any particle size or particle shape suitable for use in the methods disclosed herein. Especially desirable in such methods is the well treating composite or an aggregated pack containing the composites, as defined herein By "relatively lightweight" it is meant that the particulate has a density that is substantially less than a conventional proppant particulate material employed in hydraulic fracturing operations, e.g., sand or having a density similar to these materials. Especially preferred are those particulates having a density less than or equal to 3.25 g/cc. Even more preferred are ultra lightweight particulates having a density less than or equal to 2.25, more preferably less than or equal to 2.0, even more preferably less than or equal to 1.75, most preferably less than or equal to 1.25, g/cc. Preferably, such particulates are selected from ceramics, resin coated ceramics, glass microspheres, sintered bauxite, resin-coated sintered bauxite, aluminum pellets, aluminum needles, or nylon pellets or a mixture thereof. In a particularly preferred embodiment, the particulate is a resin coated ceramic particles or beads or is a synthetic organic particle such as nylon pellets, ceramics (including aluminosilicates such as "CARBOLITE," "NAPLITE" or "ECONOPROP").

By "substantially neutrally buoyant", it is meant that a particulate has a density sufficiently close to the density of an ungelled or weakly gelled carrier fluid (e.g., ungelled or weakly gelled completion brine, other aqueous-based fluid, or other suitable fluid) to allow pumping and satisfactory placement of the proppant particulate using the selected carrier fluid. For example, urethane resin-coated ground walnut hulls having a density of from about 1.25 to about 1.35 g/cc may be employed as a substantially neutrally buoyant proppant particulate in completion brine having a density of about 1.2 g/cc. It will be understood that these values are exemplary only. As used herein, a "weakly gelled" carrier fluid is a carrier fluid having minimum sufficient polymer, viscosifier or friction reducer to achieve friction reduction when pumped down hole (e.g., when pumped down tubing, work string, casing, coiled tubing, drill pipe, etc.), and/or may be characterized as having a polymer or viscosifier concentration of from greater than about 0 pounds of polymer per thousand gallons of base fluid to about 10 pounds of polymer per thousand gallons of base fluid, and/or as having a viscosity of from about 1 to about 10 centipoises. An ungelled carrier fluid may be characterized as containing about 0 pounds per thousand gallons of polymer per thousand gallons of base fluid.

Other suitable relatively lightweight particulates are disclosed in U.S. Pat. Nos. 6,364,018, 6,330,916 and 6,059,034, all of which are herein incorporated by reference. These may be exemplified by ground or crushed shells of nuts (pecan, almond, ivory nut, brazil nut, macadamia nut, etc); ground or crushed seed shells (including fruit pits) of seeds of fruits such as plum, peach, cherry, apricot, etc.; ground or crushed seed shells of other plants such as maize (e.g. corn cobs or corn kernels), etc.; processed wood materials such as those derived from woods such as oak, hickory, walnut, poplar, mahogany, etc. including such woods that have been processed by grinding, chipping, or other form of particalization. Preferred are ground or crushed walnut shell materials coated with a resin to substantially protect and water proof the shell. Such materials may have a density of from about 1.25 to about 1.35 g/cc, and a bulk density of about 0.67.

Further, the relatively lightweight particulate for use in the invention may be a selectively configured porous particulate, as set forth, illustrated and defined in U.S. Patent Publication No. 20040040708 A1, published on Mar. 4, 2004, herein incorporated by reference.

In another preferred embodiment, the relatively lightweight particulate is the well treating composite herein. The composite consist of at least one organic lightweight material and at least one weight modifying agent. The apparent specific gravity (ASG) of the organic lightweight material is either greater than or less than the ASG of the well treating composite.

The weight modifying agent may be a weighting agent having a higher ASG than the organic lightweight material. The presence of the weighting agent renders a well treating composite having a ASG greater than the ASG of the organic lightweight material. Alternatively, the weight modifying agent may be a weight reducing agent having a lower ASG than the organic lightweight material. The presence of the weight reducing agent renders a well treating composite having a ASG less than the ASG of the organic lightweight material.

Figure 1:
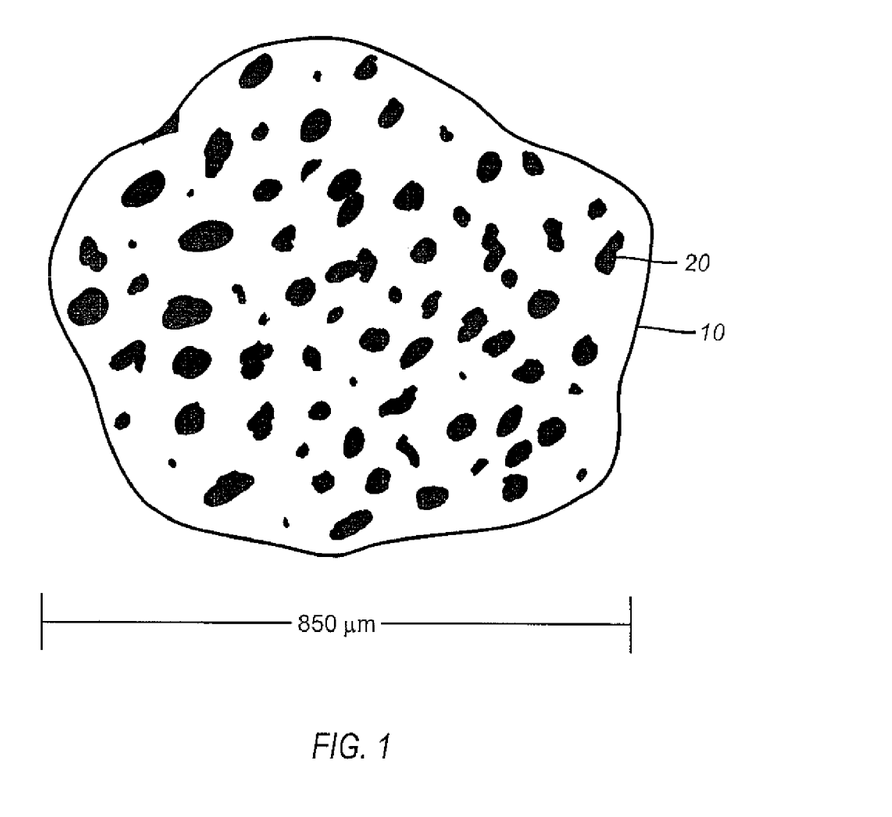
FIG. 1 is a cross-section of a well treating composite defined herein.

FIG. 1 is a cross-sectional representation of a proppant material composed of the ultra lightweight (ULW) resin composite of the invention wherein the continuous phase 10 is composed of the organic lightweight material and the discontinuous phase 20 is composed of a weight modifying material. The weight modifying agent particulates are seen as the dark spots dispersed within the continuous, resin phase. The composite particle diameter is approximately 850 microns.

The compressive strength of the composite is greater than the compressive strength of the organic lightweight material. When hardened, the composite, as well as aggregated pack of the composite, exhibits a strength or hardness to limit deformation at temperatures and/or formation closure stresses where substantially deformable materials generally become plastic and soften.

In a preferred embodiment, the weight modifying agent is selected so as to modify or customize the ASG of the composite in order to impart to the composite (or aggregated pack) the desired ASG. For example, the organic lightweight material may be treated with a weight modifying agent in such a way that the composite has a ASG close to the ASG of the carrier fluid so that it is neutrally buoyant or semi-buoyant in a fracturing fluid or sand control fluid.

Alternatively, the weight modifying material may be selected so that the composite has the structural support and strength to withstand the closure stresses of a hydraulic fractured formation, or other downhole stresses.

The amount of weight modifying agent in the well treating composite is such as to impart to the well treating composite the desired ASG. Typically, the amount of weight modifying agent in the well treating composite is less than 60 percent, preferably less than 55 percent, by volume of the well treating composite. Most preferably, the amount of weight modifying agent in the well treating composite is that amount which may ensure contact of composite in an aggregated pack. In such instances, the amount of weight modifying agent is typically less than or equal to 52 percent by volume of the well treating composite.

Preferably about 0.1 to about 10 percent by weight of the weight modifying agent consists of nanoparticle sized materials. The size of such materials enhances the strength of the composite, thereby providing greater longevity of the composite or aggregated pack of composite at downhole temperature stress environments. When used, from about 1 to about 99 weight percent of the weight modifying agent consists of nanoparticle sized materials.

Where the weight modifying agent is spherical, the average diameter or particle size of the weight modifying agent is preferably between from about 0.1 microns to about 200 microns, more preferably between from about 0.1 microns to about 50 microns. In a preferred embodiment, the mean particle size of the nanoparticles is less than or equal to 0.5 microns and more preferably less than or equal to 0.1 microns.

In another preferred embodiment, at least a portion of the weight modifying agent consists of non-spherical nanoparticles possessing at least one principal axis dimension whose length is less than 1 micron (1000 nanometers).

The organic lightweight material is preferably a polymeric material, such as a homo-, co- or terpolymer like thermosetting resin, including polystyrene, a styrene-divinylbenzene copolymer, a polyacrylate, a polyalkylacrylate, a polyacrylate ester, a polyalkyl acrylate ester, a modified starch, a polyepoxide, a polyurethane, a polyisocyanate, a phenol formaldehyde resin, a furan resin, or a melamine formaldehyde resin. The ASG of the organic lightweight material generally less than or equal to 1.1. In a preferred embodiment, the ASG of the material is between about 0.7 to about 0.8.

The amount of organic lightweight material in the well treating composite is generally between from about 40 to about 95 percent by volume, preferably between from about 50 to about 90 percent by volume, and the amount of weight modifying agent in the composite is between from about 5 to about 60 percent by volume, preferably between from about 10 to about 50 percent by volume. The ratio of the these components may be dependent upon the desired ASG of the composite. For instance, using an organic lightweight material having an ASG of 0.7 and a weight modifying agent, such as silica, having an ASG of 2.7, a 20:80 volume ratio would render an composite ASG of 2.20 and a 85:15 volume ratio would render an ASG of 1.0; a 25:75 volume ratio would render an ASG of 1.20.

In a preferred mode, the ASG of the well treating composite is at least about 0.35. In a most preferred mode, the ASG of the well treating aggregate is at least about 0.70, more preferably about 1.0, but not greater than about 1.5.

The weight modifying agent may be sand, glass, hematite, silica, sand, fly ash, aluminosilicate, carbon black and an alkali metal salt or trimanganese tetraoxide. In a preferred embodiment, the weight modifying agent is selected from finely ground sand, glass powder, glass spheres, glass beads, glass bubbles, ground glass, glass bubbles, borosilicate glass or fiberglass. Further, the weight modifying agent may be a cation selected from alkali metal, alkaline earth metal, ammonium, manganese, and zinc and an anion selected from a halide, oxide, a carbonate, nitrate, sulfate, acetate and formate. For instance, the weight modifying agent may include calcium carbonate, potassium chloride, sodium chloride, sodium bromide, calcium chloride, barium sulfate, calcium bromide, zinc bromide, zinc formate, zinc oxide or a mixture thereof.

Glass bubbles, fly ash and carbon black are the preferred components for the weight reducing agent.

The composite of the invention is generally prepared by blending the organic lightweight material with weight modifying agent for a sufficient time in order to form a slurry or a mud which is then formed into sized particles. Such particles are then hardened by curing at temperatures ranging from about room temperature to about 200° C., preferably from about 50 to about 150° C. until the weight modifying agent hardens around the organic lightweight material.

In a preferred mode, the organic lightweight material forms a continuous phase; the weight modifying forming a discontinuous phase.

The composite exhibits crush resistance under conditions as high as 10,000 psi closure stress, API RP 56 or API RP 60, generally between from about 250 to about 8,000 psi closure stress, in combination with a ASG less than or equal to 2.0, preferably less than or equal to 1.5, to meet the pumping and/or downhole formation conditions of a particular application, such as hydraulic fracturing treatment, sand control treatment.

Further, the composite defined herein exhibits a Young's modulus of between about 500 psi and about 2,000,000 psi at formation conditions, more typically between about 5,000 psi and about 500,000 psi, more typically between about 5,000 psi and 200,000 psi at formation conditions, and most typically between about 7,000 and 150,000 psi at formation conditions. The Young's modulus of the composite is substantially higher than the Young's modulus of the organic lightweight material or the weighting agent.

Typically, the particle sizes of the well treating composite defined herein ranges from about 4 mesh to about 100 mesh, alternatively from about 8 mesh to about 60 mesh, alternatively from about 12 mesh to about 50 mesh, alternatively from about 16 mesh to about 40 mesh, and alternatively about 20 to 40 mesh. In one exemplary case, the proppant may be ground walnut shells having a particle size of about 12/20 US mesh size in the first proppant stage and 20/40 US mesh size in the second proppant stage. Such proppants are less subject to settling and can be more easily transported to provide greater effective propped fracture length. Greater effective propped fracture length translates to improved stimulation efficiency, well productivity and, reservoir drainage. Another benefit of using such particulate materials is that the requirements for the mixing equipment are minimized. For instance, when the carrier fluid is a brine, the only requirements on the mixing equipment is that it be capable of (a) mixing the brine (dissolving soluble salts), and (b) homogeneously dispersing in the substantially neutrally buoyant particulate material.

The particulate material may be mixed and pumped during any desired portion(s) of a well treatment such as within a hydraulic fracturing fluid or sand control fluid, such as water, salt brine, slickwater fluid, at relatively low concentrations to achieve partial monolayer fractures, low concentration polymer gel fluids (linear or crosslinked), foams (with gas) fluid, liquid gas such as liquid carbon dioxide fracture treatments for deeper proppant penetration, treatments for water sensitive zones, and treatments for gas storage wells.

Typically, they are mixed at their desired concentration with a carrier fluid. Thus, the ASG of the particulate material is less than or equal to the ASG of the carrier fluid. Any carrier fluid suitable for transporting the particulate material into a well and/or subterranean formation fracture in communication therewith may be employed including, but not limited to, carrier fluids including a completion or workover brine, salt water, fresh water, potassium chloride solution, a saturated sodium chloride solution, liquid hydrocarbons, and/or nitrogen, carbon dioxide or other gases. Suitable carrier fluids include or may be used in combination with fluids have gelling agents, cross-linking agents, gel breakers, surfactants, foaming agents, demulsifiers, buffers, clay stabilizers, acids, or mixtures thereof.

The carrier fluids may be gelled or non-gelled or have a reduced or lighter gelling requirement as compared to carrier fluids employed with conventional fracture treatment/sand control methods. In one embodiment employing one or more of particulate material and a brine carrier fluid, mixing equipment need only include such equipment that is capable of (a) mixing the brine (dissolving soluble salts), and (b) homogeneously dispersing in the particulate material. In one embodiment, the particulate material may be advantageously pre-suspended and stored in a storage fluid, such as brine of near or substantially equal density, and then pumped or placed downhole as is, or diluted on the fly.

The well treating composites defined herein may further be used in the other well treatment operations discussed herein. For instance, when employed in well treatments, the composite may be introduced into a wellbore at any concentration deemed suitable or effective for the downhole conditions to be encountered. For example, a well treatment fluid may include a suspension of proppant or sand control composite. Alternatively, it is possible that a well treatment fluid may include a suspension that contains a mixture of conventional fracture proppant or sand control particulates such as sand with the composites. The suspension preferably forms an aggregated pack of the well treating composites that is permeable to fluids produced from the wellbore and substantially prevents or reduces production of formation materials from the formation into the wellbore.

When used in hydraulic fracturing, the relatively lightweight or substantially neutrally buoyant particulate may be injected into a subterranean formation in conjunction with a hydraulic fracturing treatment or other treatment at pressures sufficiently high enough to cause the formation or enlargement of fractures or to otherwise expose the aggregates to formation closure stress. Such other treatments may be near wellbore in nature (affecting near wellbore regions) and may be directed toward improving wellbore productivity and/or controlling the production of fracture proppant or formation sand. Particular examples include gravel packing and frac-packs. Moreover, such particulates may be employed alone as a fracture proppant/sand control particulate, or in mixtures in amounts and with types of fracture proppant/sand control materials, such as conventional fracture or sand control particulate.

In one exemplary embodiment, a gravel pack operation may be carried out on a wellbore that penetrates a subterranean formation to prevent or substantially reduce the production of formation particles into the wellbore from the formation during production of formation fluids. The subterranean formation may be completed so as to be in communication with the interior of the wellbore by any suitable method known in the art, for example by perforations in a cased wellbore, and/or by an open hole section. A screen assembly such as is known in the art may be placed or otherwise disposed within the wellbore so that at least a portion of the screen assembly is disposed adjacent the subterranean formation. A slurry including the relatively lightweight or substantially neutrally buoyant particulate material and a carrier fluid may then be introduced into the wellbore and placed adjacent the subterranean formation by circulation or other suitable method so as to form a fluid-permeable pack in an annular area between the exterior of the screen and the interior of the wellbore that is capable of reducing or substantially preventing the passage of formation particles from the subterranean formation into the wellbore during production of fluids from the formation, while at the same time allowing passage of formation fluids from the subterranean formation through the screen into the wellbore. It is possible that the slurry may contain all or only a portion of the particulate material. In the latter case, the balance of the particulate material of the slurry may be another material, such as a conventional gravel pack or sand control particulate.

As an alternative to use of a screen, the sand control method may use the particulate material in accordance with any method in which a pack of particulate material is formed within a wellbore that it is permeable to fluids produced from a wellbore, such as oil, gas, or water, but that substantially prevents or reduces production of formation materials, such as formation sand, from the formation into the wellbore. Such methods may or may not employ a gravel pack screen, may be introduced into a wellbore at pressures below, at or above the fracturing pressure of the formation, such as frac pack, and/or may be employed in conjunction with resins such as sand consolidation resins if so desired.

In one embodiment, the particulate material may be introduced or pumped in, for example, a saturated sodium chloride solution carrier fluid or a carrier fluid that is any other completion or workover brine known in the art, thus eliminating the need for damaging polymer or fluid loss material. In one embodiment, such a material may be employed as proppant/sand control particulate material at temperatures up to about 250° F., and closure stresses up to about 8000 psi. However, these ranges of temperature and closure stress are exemplary only, it being understood that the disclosed materials may be employed as proppant/sand control materials at temperatures greater than about 250° F. and/or at closure stresses greater than about 8000 psi. In any event, it will be understood with benefit of this disclosure that the particulate material may be selected by those of skill in the art to meet and withstand anticipated downhole conditions of a given application.

Furthermore, use of the particulate materials having sufficient strength and relative lightweight properties in hydraulic fracturing treatments or sand control treatments through coil tubing may greatly reduce the propensity to settle, particularly in highly deviated or horizontal wellbore sections. In this regard, the disclosed particulate materials and especially the well treating composites discussed herein may be advantageously employed in any deviated well having an angle of deviation of between about 0° and about 90° with respect to the vertical. However, in one embodiment, the particulate materials may be advantageously employed in horizontal wells, or in deviated wells having an angle with respect to the vertical of between about 30° and about 90°, alternatively between about 75° and about 90°. Thus, use of the disclosed particulate materials and especially the well treatment composites discussed herein may be employed to achieve surprising and unexpected improvements in fracturing and sand control methodology, including reduction in proppant pack and/or formation damage, and enhancement of well productivity.

In an alternative embodiment, the particulate materials may be employed for well treating purposes in combination with a variety of different types of well treating fluids (including foam, liquid and alcohol based systems and other liquefied-gas or foamed-gas carrier fluids, including anhydrous methanol and liquid carbon dioxide, carbon dioxide/nitrogen and foamed nitrogen in carbon dioxide based fracturing fluids). Such fracturing fluids are especially useful in the fracturing of formations producing natural gas. Typically, such fracturing fluids require particles of high compressive strength and deformability at increased downhole temperatures but lighter particle in light of the low ASG of the carrier fluid. The ASG for aqueous methanol, for instance, is about 0.8.

Thus, the weight modifying agent for such systems is a weight reducing agent; the ASG of the weight reducing agent being less than the ASG of the composite. In addition, the ASG of the weight reducing agent is less than the ASG of the organic lightweight material. Typically, the ASG of the weight reducing agent is less than 1.0 and the ASG of the organic lightweight material is less than or equal to 1.1.

In another disclosed embodiment, blends of two or more different types of particulate materials having different characteristics, such as different ASG or setting velocity in the carrier fluid, may be employed in well treatment. Such blends may be further employed in any type of well treatment application, including in any of the well treatment methods described elsewhere herein. In one exemplary embodiment, such blends may be employed to optimize hydraulic fracture geometries to achieve enhanced well productivity. Choice of different materials and amounts thereof to employ in such blends may be made based on one or more well treatment considerations including, but not limited to, objective/s of well treatment, such as for sand control and/or for creation of propped fractures, well treatment fluid characteristics, such as ASG and/or rheology of carrier fluid, well and formation conditions such as depth of formation, formation porosity/permeability, formation closure stress, type of optimization desired for geometry of downhole-placed particulates such as optimized fracture pack propped length, optimized sand control pack height, optimized fracture pack and/or sand control pack conductivity and combinations thereof. Such different types of well treating composites may be selected, for example, to achieve a blend of different ASGs relative to the selected carrier fluid.

Those of skill in the art will understand that selection of suitable proppant will depend, in part, on the density of the fluid of the proppant-laden slurry and on whether it is desired that the selected proppant particle be relatively lightweight or substantially neutrally buoyant in the selected fluid, and/or whether or not it is desired that the fluid be non-gelled or non-viscosified.

The initial proppant-free fluid, proppant-laden slurry as well as relatively lightweight or substantially neutrally buoyant particulate materials discussed herein, including the well treating composites, may also contain other conventional additives common to the well service industry such as breakers, surfactants, biocides, gelling agents, hardening agents, solvents, foaming agents, demulsifiers, buffers, clay stabilizers, acids, or mixtures thereof.

The following examples will illustrate the practice of the present invention in its preferred embodiments. Other embodiments within the scope of the claims herein will be apparent to one skilled in the art from consideration of the specification and practice of the invention as disclosed herein. It is intended that the specification, together with the examples, be considered exemplary only, with the scope and spirit of the invention being indicated by the claims that follow.

EXAMPLES

The Examples demonstrate the ability of the process of the invention to control water production.

A fracture was simulated using the Mfrac three-dimensional hydraulic fracturing simulator of Meyer & Associates, Inc. using a simple 3-layer isotropic homogeneous 0.1 mD permeability gas reservoir model, 40 acre spacing. The fracture was designed to be placed into the zone at a theoretical depth of approximately 9800 to about 9900 feet and the model was run in full 3-D mode. Since the Mfrac model does not make calculations for a partial monolayer, the conductivity of the proppant was artificially increased at a concentration of 0.5 lbs/sq. ft. at a rate of 50 barrels per minute (bpm).

Figure 2:
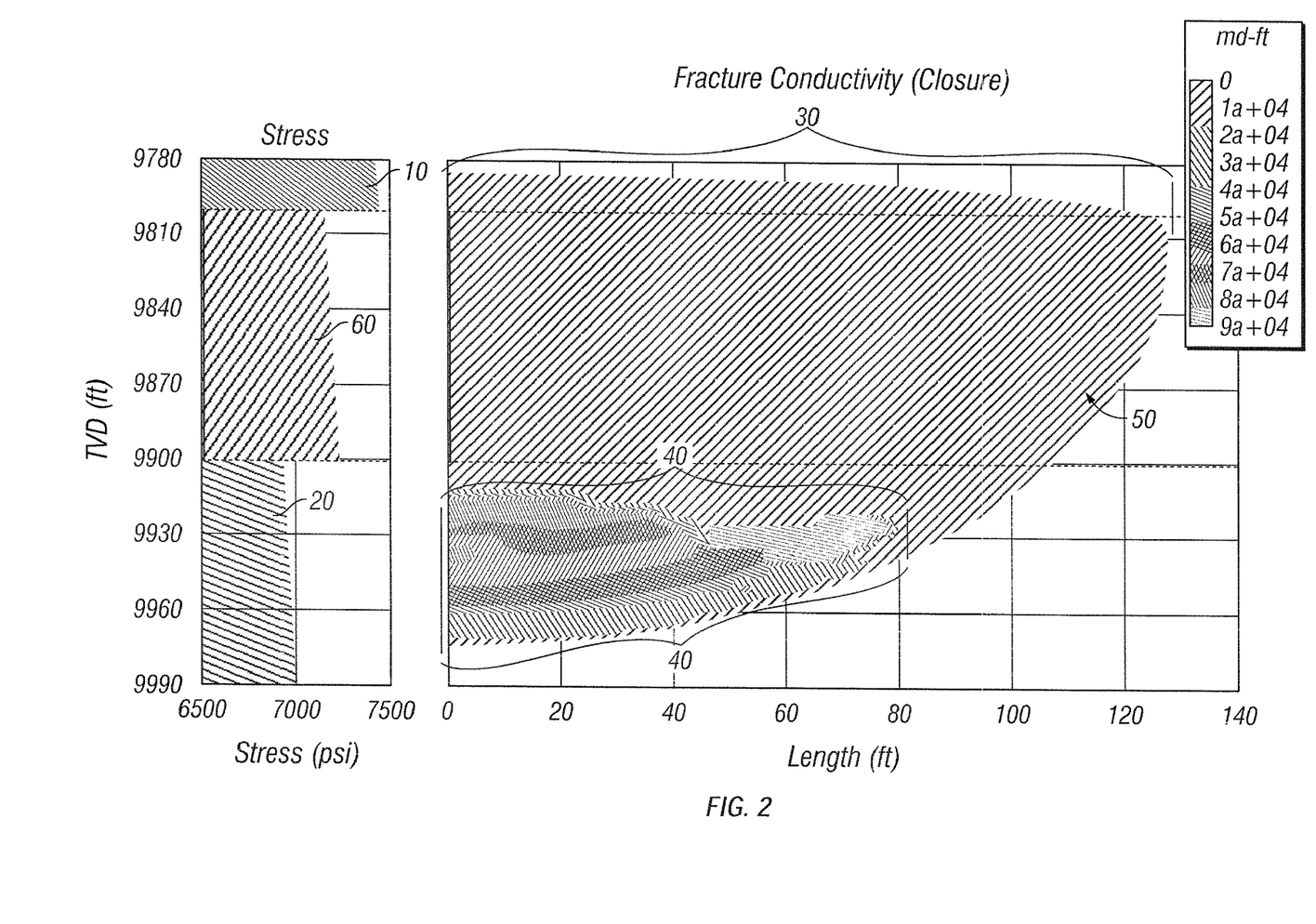
FIGS. 2 and 3 are 2D depictions of a fracture, after closure of the fracture, initiated with a fracturing fluid containing sand as the proppant and a brine slickwater fluid.
Figure 3:
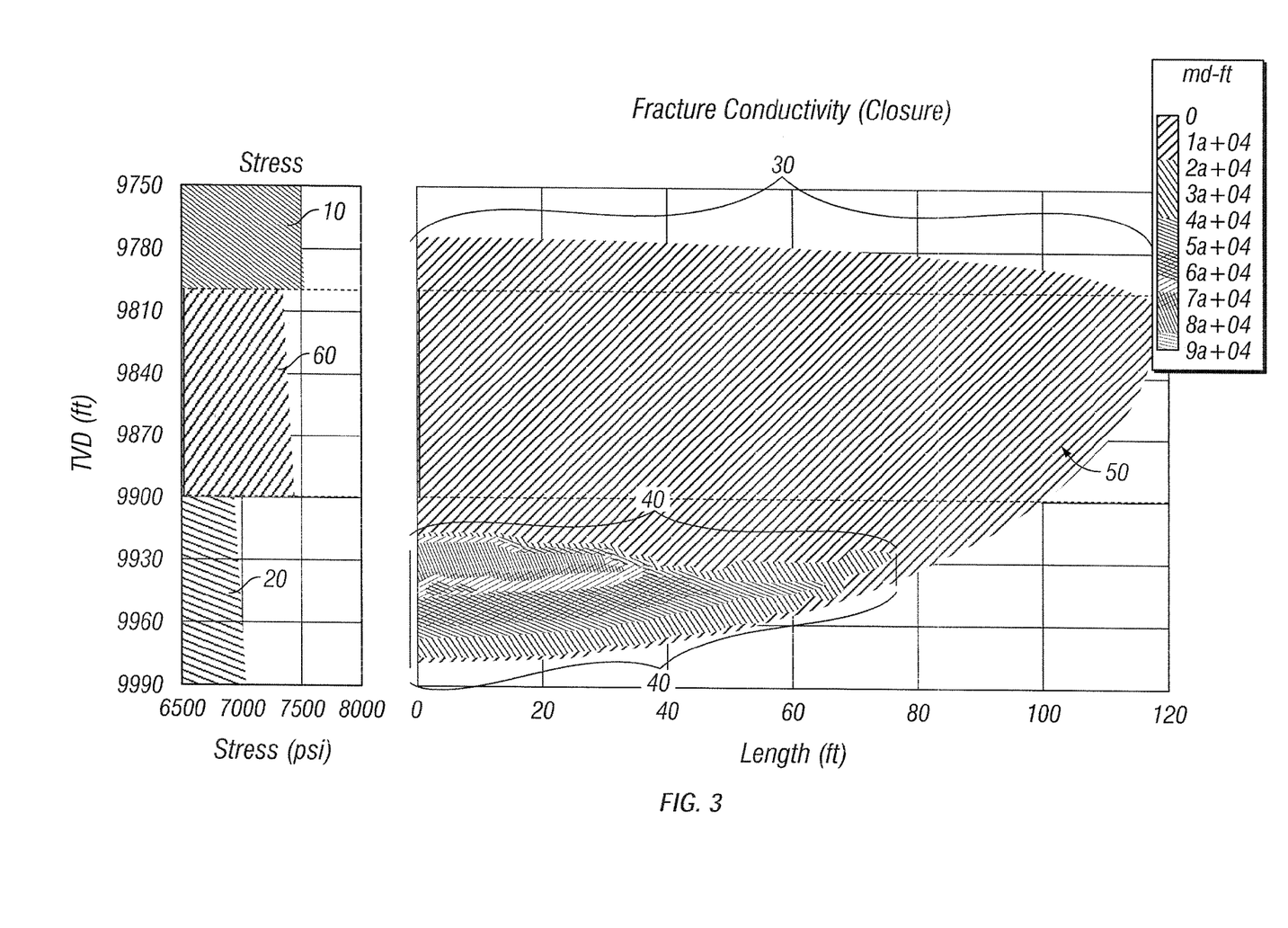
Figure 4:
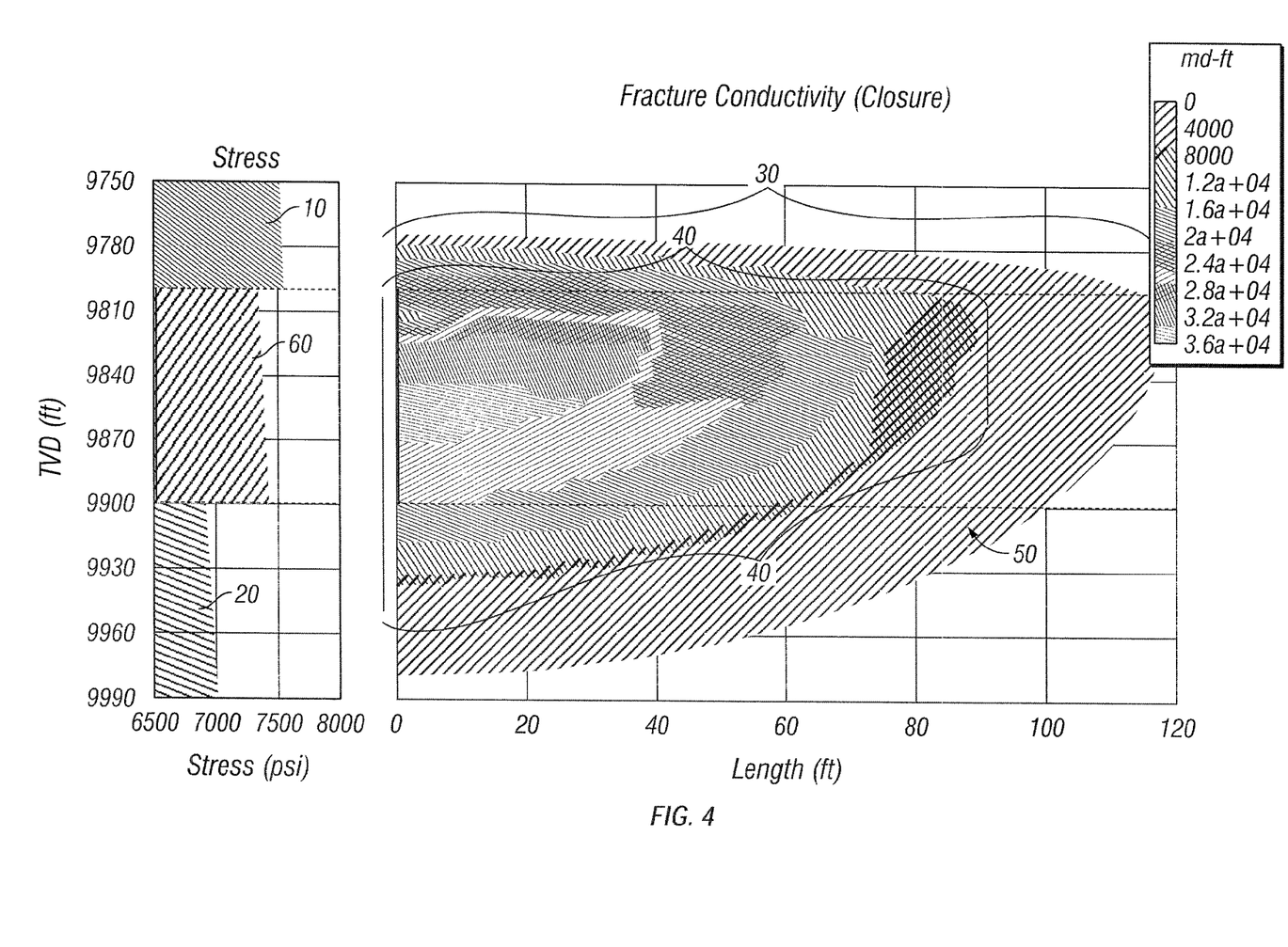
FIG. 4 is a depiction of a fracture, after closure of the fracture, initiated with a pre-pad fluid, followed by a slickwater brine containing an ultra lightweight proppant.

Fracture conductivity between the proppant-packed fracture and that of the native reservoir, mathematically defined as:

(proppant pack permeability×fracture width)/(formation permeability×propped fracture half length), is illustrated in the conductivity profiles of FIGS. 2, 3 and 4 after closure of the fracture.

FIG. 2 is a 2D depiction of the fracture of injection of the fracturing fluid using sand as the proppant and a standard 8.4 ppg brine slickwater fluid. FIG. 3 displays an identical job design except that a 10 ppg densified slickwater brine was used in place of the 8.4 ppg brine as fracturing fluid. FIG. 4 displays the same job design but use of a pre-pad fluid of 10 ppg slickwater brine and the remaining fluid being 8.4 ppg slickwater brine containing LiteProp™ 125 lightweight proppant, a product of BJ Services Company, having a density of 1.25 g/cc. The amount of LiteProp™ 125 is volumetrically equivalent to the jobs set forth in FIG. 2 and FIG. 3. In all three of the fracture designs, an identical pump schedule was used in terms of fluid volumes; the proppant mass was adjusted for density differences to yield equivalent proppant volumes for each job design.

The left hand portion of the figures shows a simulated stress profile that could be prevalent in cases where a water-bearing lower zone might be present. The upper zone 10 on the stress profile is a shale zone with a confining stress that will tend to contain the fracture from growing up too high. The lower zone, 20, on the other hand, has a lower stress profile that invites the fracture to propagate into it.

The created fracture area, represented as 30, is the area of the reservoir traversed by the brine slickwater fluid. The propped fracture area, 40, is contributory to well stimulation, and represents the area of the reservoir propped open to provide improved fracture conductivity. The created but unpropped area 50, heals upon fracture closure and, thus, is not considered to be stimulated.

As evidenced in FIG. 2, the sand proppant settles in lower zone 20, thereby stimulating the water producing zone while providing little, if any, benefit to the productivity of the zone of interest 60. The ultimate result of the fracture is very high water production, and little or no hydrocarbon production. Little difference between the simulations of FIG. 2 and FIG. 3 can be detected. The additional brine density modifies proppant transport somewhat, but overall the results are very similar. As set forth in FIG. 4, the densified 10 ppg slickwater brine migrates toward the bottom of the fracture, allowing the ultra lightweight density (8.4 ppg slickwater) brine to override the higher density brine and stay mostly in zone of interest 60. This process effectively limits, if not eliminates, water production from an adjacent water zone below the zone of interest and shows no increase in conductivity in the water producing zone.

Other embodiments within the scope of the claims herein will be apparent to one skilled in the art from consideration of the specification and practice of the invention as disclosed herein. It is intended that the specification be considered exemplary only, with the scope and spirit of the invention being indicated by the claims which follow.

What is claimed is:

1. A particulate of a well treating composite comprising an organic lightweight material and a weight modifying agent wherein the apparent specific gravity (ASG) of the organic lightweight material is either greater or less than the ASG of the composite and further wherein the amount of organic lightweight material in the composite is greater than 40 percent by volume.

2. The particulate of claim 1, wherein the weight modifying agent is either spherical having an average diameter or particle size between from about 0.1 to about 200 microns or non-spherical having at least one principal axis dimension whose length is less than or equal to 500 nanometers.

3. The particulate of claim 2, wherein the weight modifying agent is spherical and has an average diameter or particle size of less than 1 micron.

4. The particulate of claim 3, wherein the weight modifying agent has an average diameter or particle size of less than or equal to 0.5 microns.

5. The particulate of claim 2, wherein the weight modifying agent is selected from the group consisting of fly ash, carbon powder, carbon black, glass bubbles, glass spheres and fiberglass.

6. The particulate of claim 1, wherein the organic lightweight material is a thermosetting resin.

7. The particulate of claim 4, wherein the organic lightweight material is polystyrene, a styrene-divinylbenzene copolymer, a polyacrylate, a polyalkylacrylate, a polyacrylate ester, a furan resin, a polyalkyl acrylate ester, a modified starch, a polyepoxide, a polyurethane, a polyisocyanate, polyamide, a polyolefin, a phenol formaldehyde resin, or a melamine formaldehyde resin.

8. A proppant comprising at least one particulate of claim 1.

9. The particulate of claim 8, wherein the weight modifying agent is selected from the group consisting of glass, hematite, silica, sand, fly ash, carbon black, aluminosilicate, trimanganese tetraoxide, calcium carbonate, calcium chloride, calcium bromide, barium sulfate, an alkali metal salt, zinc bromide or a mixture thereof.

10. The particulate of claim 8, wherein the weight modifying agent is selected from the group consisting of glass bubbles, fly ash and carbon black.

11. The particulate of claim 1, wherein the weight modifying agent is a weighting agent.

12. The particulate of claim 11, wherein the ASG of the well treating composite is at least one and a half times the ASG of the organic lightweight material.

13. The particulate of claim 1, wherein the organic lightweight material is polymeric.

14. The particulate of claim 1, wherein the organic lightweight material is a copolymer or terpolymer.

15. The particulate of claim 1, wherein the amount of weight modifying agent in the well treatment composite is less than or equal to 52% by volume of the well treating composite.

16. The particulate of claim 1, wherein the ASG of the composite is between from about 0.7 to about 1.5.

17. The particulate of claim 1, wherein the amount of weight modifying agent in the well treating composite is between about 10 to about 60 percent by volume.

18. The particulate of claim 1, wherein the weight modifying agent includes a cation selected from alkali metal, alkaline earth metal, ammonium, manganese, and zinc and an anion selected from a halide, an oxide, a carbonate, nitrate, sulfate, acetate and formate.

19. A particulate of a well treating composite having an apparent specific gravity (ASG) between from about 0.7 to about 1.5 comprising a continuous phase and a discontinuous phase, where the continuous phase is an organic lightweight material, and the discontinuous phase is a weight modifying agent, wherein the amount of weight modifying agent in the composite is greater than or equal to 40 percent by volume and further wherein from about 1 to about 99 weight percent of the weight modifying agent are either spherical particulates having an average diameter or particle size between from about 0.1 to about 200 microns or non-spherical particulates having a length less than or equal to 500 nanometers in at least one principal axis.

20. The particulate of claim 19, wherein the organic lightweight material is a thermosetting resin.

21. The particulate of claim 19, wherein the organic lightweight material is polystyrene, a styrene-divinylbenzene copolymer, a polyacrylate, a polyalkylacrylate, a polyacrylate ester, a polyalkyl acrylate ester, a modified starch, a polyepoxide, a polyurethane, a polyisocyanate, polyamide, a polyolefin, a phenol formaldehyde resin, a furan resin or a melamine formaldehyde resin.

22. The particulate of claim 19, wherein the weighting agent is selected from the group consisting of glass bubbles, fly ash and carbon black.

23. A particulate of a well treating composite comprising an organic lightweight material and a weight reducing agent wherein the apparent specific gravity (ASG) of the organic lightweight material is less than the ASG of the composite.

24. The particulate of claim 23, wherein the weight reducing agent is spherical and has a diameter less than or equal to 0.5 microns.

25. The particulate of claim 23, wherein the weight reducing agent is non-spherical and has at least one principal axis dimension whose length is less than 1 micron.

* * * * *

UNITED STATES PATENT AND TRADEMARK OFFICE
CERTIFICATE OF CORRECTION

| | |
|---|---|
| PATENT NO. | : 7,772,163 B1 |
| APPLICATION NO. | : 11/971811 |
| DATED | : August 10, 2010 |
| INVENTOR(S) | : Brannon et al. |

Page 1 of 1

It is certified that error appears in the above-identified patent and that said Letters Patent is hereby corrected as shown below:

Column 15, Claim 7., first sentence should read:
7. The particulate of claim 6, wherein the organic light- Signed and Sealed this Fifth Day of October, 2010

David J. Kappos
*Director of the United States Patent and Trademark Office*

UNITED STATES PATENT AND TRADEMARK OFFICE
CERTIFICATE OF CORRECTION

PATENT NO. : 7,772,163 B1  Page 1 of 1
APPLICATION NO. : 11/971811
DATED : August 10, 2010
INVENTOR(S) : Brannon et al.

It is certified that error appears in the above-identified patent and that said Letters Patent is hereby corrected as shown below:

Column 15, line 26 (Claim 7, line 1) should read:
   7. The particulate of claim 6, wherein the organic light- This certificate supersedes the Certificate of Correction issued October 5, 2010.

Signed and Sealed this

Ninth Day of November, 2010

David J. Kappos
*Director of the United States Patent and Trademark Office*